(12) United States Patent
Sugano

(10) Patent No.: US 12,537,812 B2
(45) Date of Patent: Jan. 27, 2026

(54) CERTIFICATION VERIFICATION DEVICE, CERTIFICATION VERIFICATION METHOD, AND NON-TRANSITORY COMPUTER-READABLE STORAGE MEDIUM STORING CERTIFICATION VERIFICATION PROGRAM

(71) Applicant: DENSO CORPORATION, Kariya (JP)

(72) Inventor: Yasuharu Sugano, Kariya (JP)

(73) Assignee: DENSO CORPORATION, Kariya (JP)

( * ) Notice: Subject to any disclaimer, the term of this patent is extended or adjusted under 35 U.S.C. 154(b) by 96 days.

(21) Appl. No.: 18/660,278

(22) Filed: May 10, 2024

(65) Prior Publication Data
US 2024/0380747 A1  Nov. 14, 2024

(30) Foreign Application Priority Data
May 12, 2023  (JP) .................................. 2023-079407

(51) Int. Cl.
*H04L 9/32* (2006.01)
*H04L 9/40* (2022.01)

(52) U.S. Cl.
CPC ........ *H04L 63/0823* (2013.01); *H04L 9/3297* (2013.01)

(58) Field of Classification Search
CPC ............... H04L 63/0823; H04L 9/3297; H04L 2463/121; H04L 9/3268
See application file for complete search history.

(56) References Cited

U.S. PATENT DOCUMENTS

2024/0106663 A1\* 3/2024 Thanickel ............. H04L 9/3268

FOREIGN PATENT DOCUMENTS

JP          2015-119243 A     6/2015

\* cited by examiner

*Primary Examiner* — Izunna Okeke
(74) *Attorney, Agent, or Firm* — Harness, Dickey & Pierce, P.L.C.

(57) ABSTRACT

By a certification verification device, a certification verification method, or a non-transitory computer-readable storage medium storing a certification verification program, a certification is received from an authentication request device and first date and time information that is time and date information from a date and time distribution device, the first date and time information is stored, a generated or received log is stored, it is verified whether the certification has expired using the first date and time information, and use second date and time information associated with the stored log is used to verify whether the certification has expired.

10 Claims, 10 Drawing Sheets

FIG. 4
(a) <u>VERIFICATION OF WHETHER EXPIRATION DATE HAS PASSED</u>
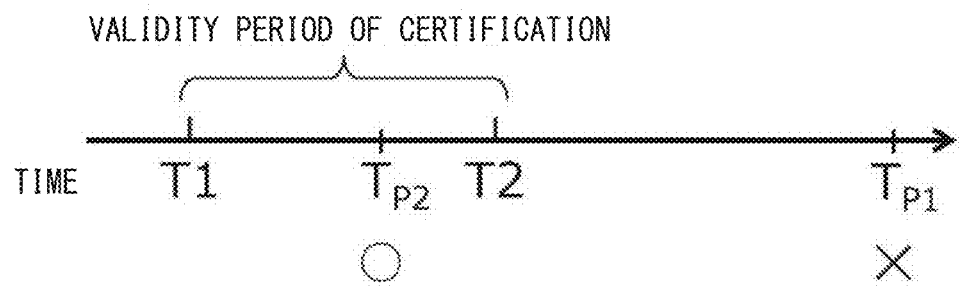
(b) <u>EXPIRATION VERIFICATION</u>
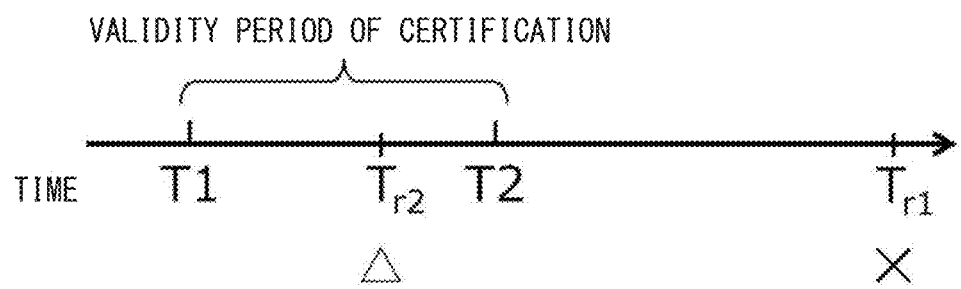
✕ : EXPIRATION DATE HAS PASSED (OUTSIDE VALIDITY PERIOD)
△ : DETERMINATION IMPOSSIBLE
○ : BEFORE EXPIRATION DATE (INSIDE VALIDITY PERIOD)

CERTIFICATION VERIFICATION DEVICE, CERTIFICATION VERIFICATION METHOD, AND NON-TRANSITORY COMPUTER-READABLE STORAGE MEDIUM STORING CERTIFICATION VERIFICATION PROGRAM

CROSS REFERENCE TO RELATED APPLICATION

The present application claims the benefit of priority from Japanese Patent Application No. 2023-079407 filed on May 12, 2023. The entire disclosure of the above application is incorporated herein by reference.

TECHNICAL FIELD

The present disclosure relates to a certification verification device, a certification verification method implemented by the certification verification device, and a non-transitory computer-readable storage medium storing a program executable by the certification verification device or the certification verification method. The certification verification device is mainly installed in an in-vehicle electronic control system, receives a certification such as X.509 from an authentication request device, and verifies an expiration date of the certification.

BACKGROUND

Various electronic control units connected via an in-vehicle network are mounted on an automobile. With recent development of automated driving technology, functions required for the automobile become complicated, and thus the number of electronic control units mounted on the automobile is increasing.

An electronic control unit transmits and receives programs and data to and from other electronic control units inside an electronic control system and devices external to the electronic control system by verifying signatures and decrypting codes using public keys. In this case, a public key certification can be used to prove whether the public key really belongs to its owner.

Since the public key certification have an expiration date, it is necessary to verify whether the certification has expired. In a comparative example, in order to verify whether the certification has expired, it is verified whether the certification is within a validity period based on date and time information acquired by a GPS receiver.

SUMMARY

By a certification verification device, a certification verification method, or a non-transitory computer-readable storage medium storing a certification verification program, a certification is received from an authentication request device and first date and time information that is time and date information from a date and time distribution device, the first date and time information is stored, a generated or received log is stored, it is verified whether the certification has expired using the first date and time information, and use second date and time information associated with the stored log is used to verify whether the certification has expired.

BRIEF DESCRIPTION OF THE DRAWINGS

FIG. 2 is a diagram illustrating a configuration example of an electronic control system and a relationship with the certification verification device and the like.

FIG. 4 is a diagram illustrating a determination operation of a certification verification unit of the certification verification device according to the first embodiment.

DETAILED DESCRIPTION

Figure 1:
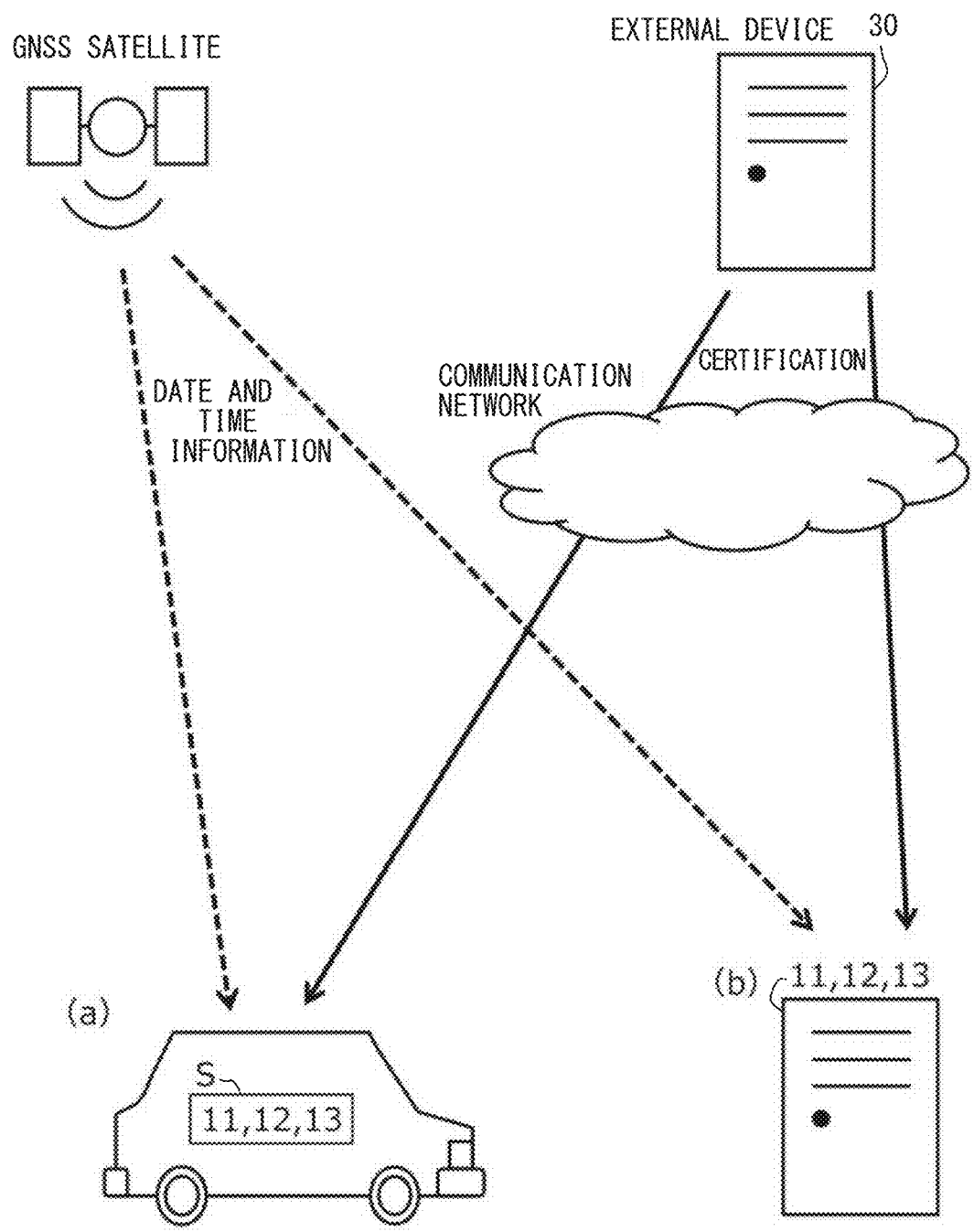
FIG. 1 is a diagram illustrating an arrangement of a certification verification device and peripheral devices.

The present inventor has found the following difficulties as a result of detailed study. When the date and time information cannot be received due to some abnormal state such as a communication breakdown, it becomes impossible to verify whether a public key certification has expired. For example, in a case of a device mounted on a mobile object, a communication environment changes as the device moves, so it is not always possible to receive the date and time information.

Therefore, one example of the present disclosure implements a certification verification device and the like capable of verifying that a public key certification has expired even when the reception of date and time information is not possible due to some abnormal state.

According to one example embodiment, a certification verification device for verifying an expiration date of a certification includes: a receiver configured to receive the certification from an authentication request device, and first date and time information that is time and date information from a date and time distribution device; a date and time information storage configured to store the first date and time information; a log storage configured to store a log generated or received by the certification verification device; and a certification verification unit configured to verify whether the certification has expired using the first date and time information. Reception of the first date and time information by the receiver is not possible, the certification verification unit uses second date and time information associated with the log stored in the log storage to verify whether the certification has expired. According to another example embodiment, a certification verification method is executed by a certification verification device that verifies an expiration date of a certification, and includes: receiving the certification from an authentication request device and first date and time information that is time and date information from a date and time distribution device; storing the first date and time information; storing a log generated or received by the certification verification device; verifying whether the certification has expired using the first date and time information; and when reception of the first date and time information is not possible, using second date and time information associated with the stored log to verify whether the certification has expired. Further, according to another example embodiment, a non-transitory computer-readable storage medium stores a certification verification program that is executable by a certification verification device that verifies an expiration date of a certification, the program being configured to: receive the certification from an authentication request device and first date and time information that is time and date information from a date and time distribution device; store the first date and time information; store a log generated or received by the certification verification device; verify whether the certification has expired using the first date and time information; and, when reception of the first date and time information is not possible, use second date and time information associated with the stored log to verify whether the certification has expired.

According to the above configurations, the certification verification device and the like of the present disclosure verifies that the certification has expired using the date and time information linked to the log stored in the log storage. Therefore, it is possible to verify that the certification has expired even when the date and time information cannot be received.

The following will describe embodiments of the present disclosure with reference to the drawings.

When there are multiple embodiments (including modifications), the configurations disclosed in the embodiments are not limited to the embodiments, and can be combined across the embodiments. For example, the configuration disclosed in one embodiment may be combined with other embodiments. The disclosed configurations in respective multiple embodiments may be partially combined.

1. Configuration as Prerequisite of Each Embodiment (1) Arrangement of Certification Verification Device and Peripheral Devices FIG. 1 is a diagram illustrating an arrangement of the "certification verification device" of each embodiment. For example, a certification verification device 11, a certification verification device 12, or a certification verification device 13 (hereinafter abbreviated as the certification verification device 11 and the like) may serve as a device for constituting an electronic control system S as shown in a part (a) of FIG. 1, or serve as a device that is different from the electronic control system S and mounted on a vehicle, which is a "mobile object". Alternatively, the certification verification device 11 and the like do not necessarily have to be "mounted" on the "mobile object" as shown in a part (b) of FIG. 1. Examples of a form of the certification verification device 11 and the like in the part (a) of FIG. 1 include an electronic control unit (ECU), but are not limited thereto. Examples of the form of the certification verification device 11 and the like in the part (b) of FIG. 1 include a personal computer (PC) or a smartphone, but are not limited thereto. Here, the "mobile object" refers to a movable object, and a movement speed is arbitrary. A case where the mobile object is stopped is also included. Examples of the moving object include, but are not limited to, an automobile, a motorcycle, a bicycle, a pedestrian, a ship, an aircraft, and an object mounted thereon. The term "mounted" includes not only a case where an object is directly fixed to the moving object but also a case where an object is moved together with the mobile object although the object is not fixed to the mobile object. For example, the case may be a case where a person riding on the mobile object carries the object, or a case where the object is mounted on a load placed on the mobile object.

In a case of the part (a) of FIG. 1, the certification verification device 11 and the like receive a public key certification (hereinafter abbreviated as a certification) from an external device 30 via a communication network mainly based on wireless communication. When the vehicle is parked or accommodated in a repair shop, the file may be received via a communication network using wired communication. In a case of the part (b) of FIG. 1, the certification verification device 11 or the like receives a file from the external device 30 via wireless communication or wired communication.

Examples of the wireless communication include, for example, IEEE802.11 (Wi-Fi: registered trademark), IEEE802.16 (WiMAX: registered trademark), W-CDMA (Wideband Code Division Multiple Access), HSPA (High Speed Packet Access), LTE (Long Term Evolution), LTE-A (Long Term Evolution Advanced), 4G, 5G, and the like. Alternatively, dedicated short range communication (DSRC) can be used. Examples of the wired communication include, for example, IEEE802.3 (Ethernet), CAN (Control Area Network), CAN FD (CAN with Flexible Data rate), and fixed telephone lines.

Further, the certification verification device 11 receives date and time information indicating a time when a positioning signal was transmitted from a GNSS satellite. Note that the date and time information may be acquired by other methods. For example, standard time information may be received from an NTP (Network Time Protocol) server.

Figure 2:
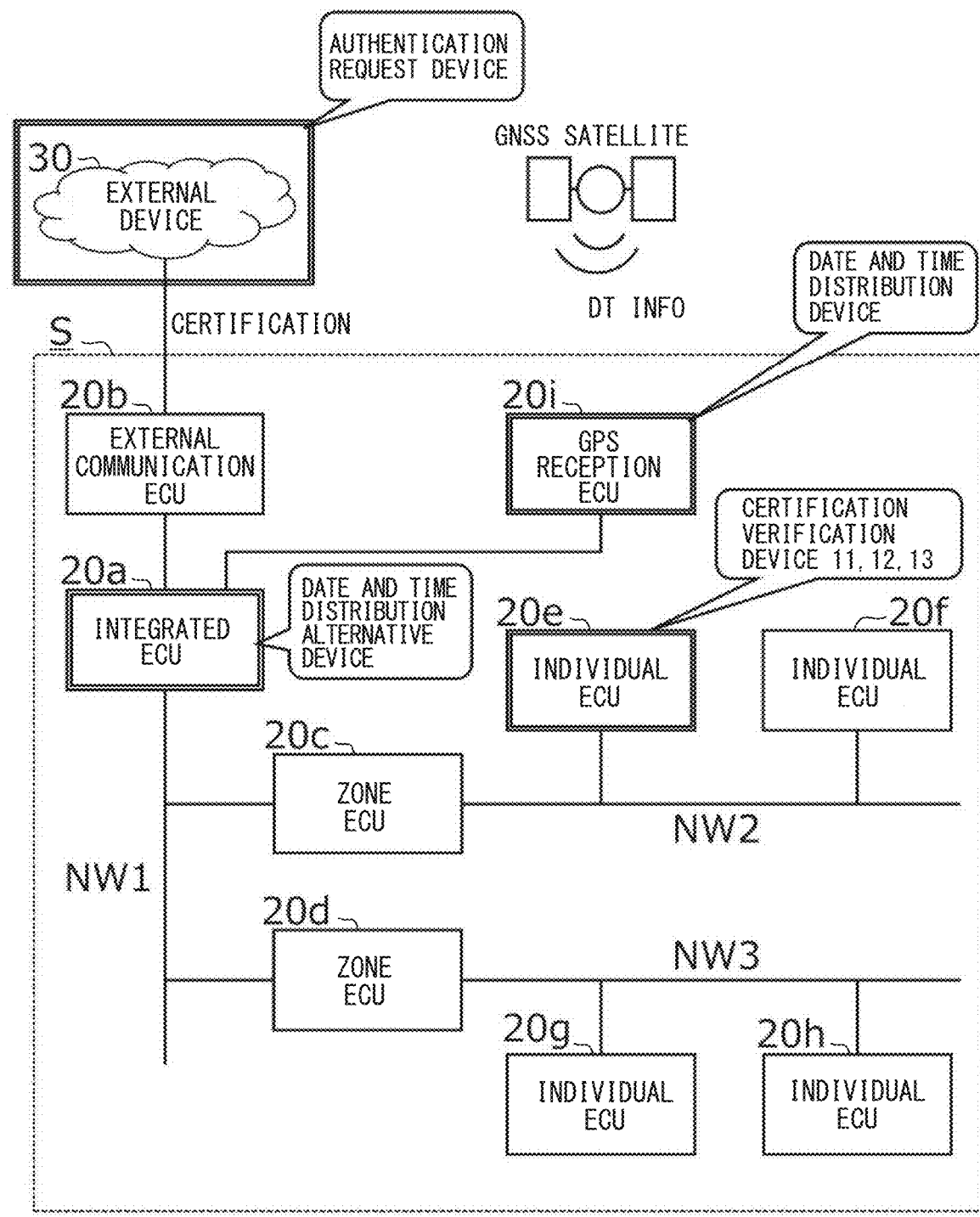

(2) Configuration of Electronic Control System and Relationship with Certification Verification Device FIG. 2 is a diagram showing a configuration example of the electronic control system S. The electronic control system S includes a plurality of electronic control units 20 (hereinafter referred to as ECUs) and in-vehicle networks (NW1 to NW3) that connect these. Although FIG. 2 illustrates nine ECUs (ECUs 20a to 20i), it is obvious that the electronic control system S may include any number of ECUs. In the following description, the ECU 20 and the ECUs 20 are described comprehensively for a single or multiple electronic control units, and the ECU 20a, ECU 20b, ECU 20c, and the like are described when individual electronic control units are specifically described.

In the case of FIG. 2, the ECUs 20 are connected to one another via an in-vehicle communication network such as controller area network (CAN) or local interconnect network (LIN). Alternatively, connection may be made by using any communication method, whether wired or wireless, such as Ethernet (registered trademark), Wi-Fi (registered trademark), and Bluetooth (registered trademark).

The electronic control system S illustrated in FIG. 2 includes the integrated ECU 20a, the external communication ECU 20b, the zone ECUs (20c, 20d), the individual ECUs (20e to 20h), and the GPS reception ECU 20i.

The integrated ECU 20a is an ECU having a function of controlling the entire electronic control system S and a gateway function of mediating communication among the ECUs 20. The integrated ECU 20a may be referred to as a gateway ECU (G-ECU) or a mobility computer (MC). The integrated ECU 20a may be a relay device or a gateway device.

The external communication ECU 20b is an ECU including a communication unit that communicates with an external device provided outside the vehicle, for example, the external device 30 in each embodiment. A communication method used by the external communication ECU 20b is the wireless communication method or the wired communication method described with reference to FIG. 1. In each embodiment, the external communication ECU 20b receives a certification from the external device 30. In order to implement multiple communication methods, multiple external communication ECUs 20b may be provided. Instead of providing the external communication ECU 20b, the integrated ECU 20a may have a function of the external communication ECU 20b.

Each of the zone ECUs (20c, 20d) is an ECU having a gateway function appropriately provided according to a function or a location where the individual ECU to be described later is arranged. For example, the zone ECU 20c is an ECU having a gateway function of mediating communication between the individual ECU 20e and the individual ECU 20f disposed on a front side of the vehicle and other ECUs 20, and the zone ECU 20d is an ECU having a gateway function of mediating communication between the individual ECU 20g and the individual ECU 20h disposed on a rear side of the vehicle and other ECUs 20. The zone ECUs (20c, 20d) may be referred to as domain computers (DCs). The individual ECU 20e and the individual ECU 20f are connected to the zone ECU 20c via the network 2 (NW2), and the individual ECU 20g and the individual ECU 20h are connected to the zone ECU 20d via the network 3 (NW3).

The individual ECUs (20e to 20h) can be implemented by ECUs having any function. Examples thereof include a drive system electronic control unit that controls an engine, a steering wheel, a brake, and the like, a vehicle body system electronic control unit that controls a meter, a power window, and the like, an information system electronic control unit such as a navigation device, and a safety control system electronic control unit that performs control for preventing a collision with an obstacle or a pedestrian. The ECUs may be classified into a master and a slave instead of being arranged in parallel.

Further, the GPS reception ECU 20i receives date and time information indicating a time when a positioning signal was transmitted from a GNSS satellite. The received date and time information may be used as is, but in order to obtain a more accurate time, it may be corrected based on the time required from the GNSS satellite to the GPS reception ECU 20i. The GPS reception ECU 20i outputs the date and time information to the integrated ECU 20a. Note that the GPS reception ECU 20i may be included in the external communication ECU 20b.

Note that each ECU 20 may be not only a physically independent electronic control unit but also a virtual electronic control unit implemented by using a virtualization technology. Further, when each ECU 20 is implemented by different hardware, it is sufficient that they are connected via a wired or wireless communication method. When multiple virtualized electronic control units are implemented on the same hardware, it is sufficient that the virtualized electronic control units are virtually connected to each other.

The certification verification device 11 of each embodiment described later may be a device that verifies the integrity of a public key using a certification received by the external communication ECU 20b and uses this public key, corresponds to each ECU 20. In FIG. 2, the individual ECU 20e is the certification verification device 11 or the like of each embodiment. Further, the external device 30 corresponds to an authentication request device, and the GPS reception ECU 20i corresponds to a date and time distribution device.

Note that the authentication request device may be an internal device of the electronic control system S. For example, the integrated ECU 20a may be used as the authentication request device. Further, the date and time distribution device may be a device inside the electronic control system S and may be a device other than the GPS reception ECU 20i. For example, the integrated ECU 20a may be used as the date and time distribution device. Alternatively, the date and time distribution device may be a device external to the electronic control system S. For example, the GNSS satellite may be used as the date and time distribution device.

Hereinafter, the certification verification device 11 as an example of the first embodiment, the certification verification device 12 as an example of a second embodiment, and the certification verification device 13 as an example of a third embodiment will be described.

2. First Embodiment (1) Configuration of Certification Verification Device

Figure 3:
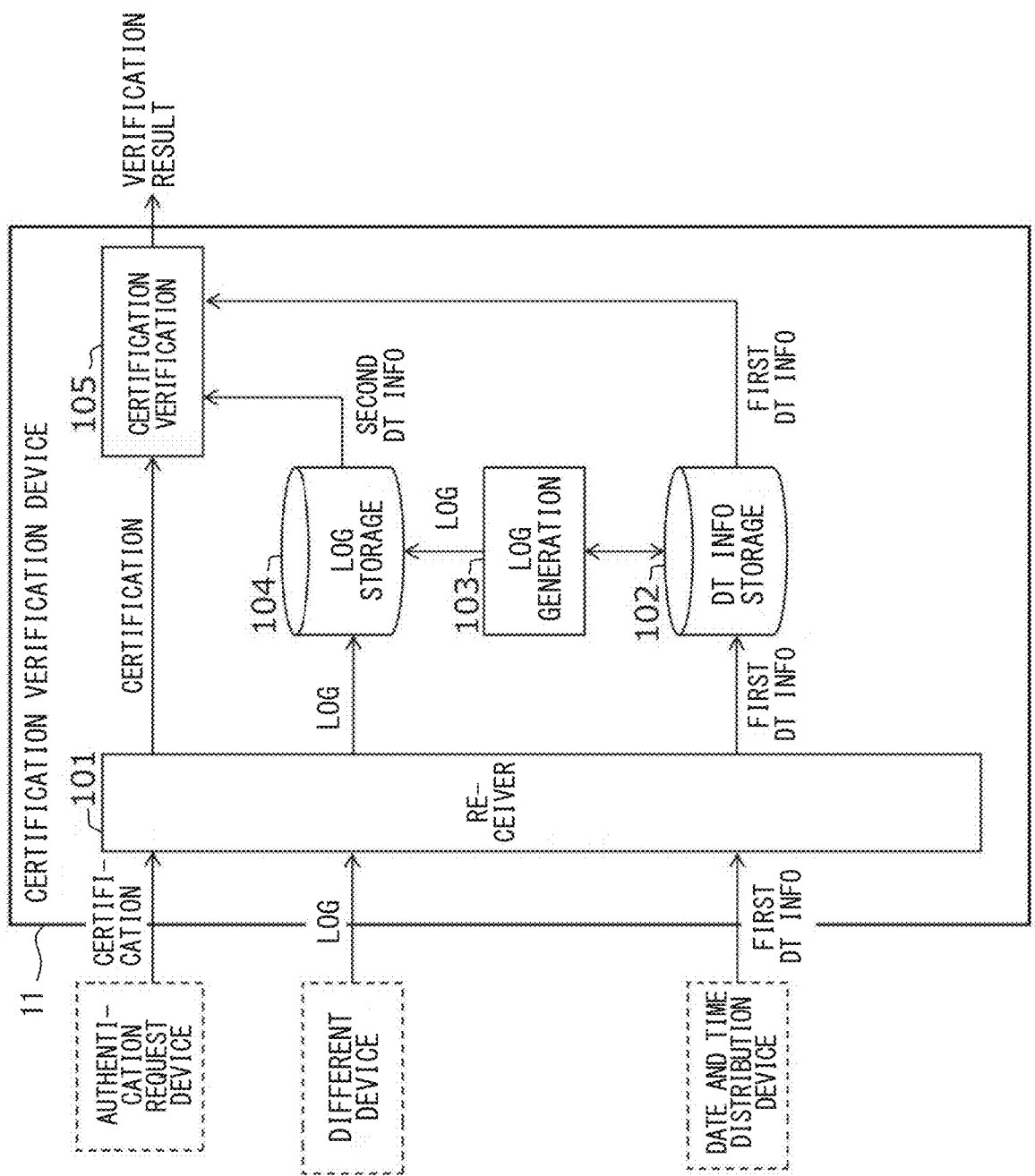
FIG. 3 is a block diagram illustrating a configuration of the certification verification device according to a first embodiment.

A configuration example of the certification verification device 11 according to the present embodiment will be described with reference to FIG. 3. The certification verification device 11 includes a receiver 101, a date and time information storage 102, a log generation unit 103, a log storage 104, and a certification verification unit 105. In this embodiment, it is assumed that the certification verification device 11 is provided in the individual ECU 20e in FIG. 2.

The certification verification device 11 can be implemented by a general-purpose central processing unit (CPU), a volatile memory such as a RAM, a non-volatile memory such as a ROM, a flash memory, or a hard disk, various interfaces, and an internal bus connecting these. Then, by executing software on these hardware, the communication device can be configured to execute the function described in each functional block as shown in FIG. 3.

The certification verification device 11 is a device that verifies the "expiration date" of the "certification". The same applies to the certification verification device 12 according to the second embodiment and the certification verification device 13 according to the third embodiment. Here, the "certification" may be anything that certifies an owner of the public key. The term "expiration date" is sufficient as long as it is a timing standard that indicates that the certification is valid, and may be a condition for fulfilling the validity period in addition to the time limit or period.

The receiver 101 receives the authentication from the authentication request device. In this embodiment, since the authentication request device is the external device 30, the receiver 101 receives the certification transmitted from the external device 30 via the external communication ECU 20b, the integrated ECU 20a, and the zone ECU 20c. The received certification is, for example, a public key with a certification authority's signature, but is not limited to this.

The receiver 101 also receives first date and time information, which is "date and time" information, from the date and time distribution device. In the drawings, the date and time information may be also referred to as DT INFO. In this embodiment, the date and time distribution device is the GPS reception ECU 20i. Therefore, the receiver 101 receives the first date and time information generated by the GPS reception ECU 20i based on the date and time information received from the GNSS satellite, via the integrated ECU 20a and the zone ECU 20c. Although the first date and time information includes day, hour, minute, and second information in this embodiment, it is not limited thereto. The first date and time information may be received at regular intervals, for example, every second, or by transmitting a request to the date and time distribution device. Note that the date and time distribution device may always receive date and time information from the GNSS satellite when radio waves from the GNSS satellite are received, or may periodically receive date and time information from the GNSS satellite. Here, the "date and time" may be a calendar day, a calendar time, or a calendar day and time. The time may include an hour, an hour and a minute, an hour, a minute, and a second, or a unit of time shorter than a second. In addition, it may be information that indirectly indicates the date and time.

The date and time information storage 102 stores the first date and time information received by the receiver 101. The date and time information storage 102 may use a nonvolatile or volatile recording medium. The date and time information storage 102 may always store only the latest first date and time information, but it may also store information for a certain period in the past. Note that the date and time information storage 102 may store third date and time information in addition to the first date and time information. The third date and time information will be described in the third embodiment.

The log generation unit 103 generates various logs that should be generated by the certification verification device 11 itself, that is, by the individual ECU 20e that implements the certification verification device 11 in this embodiment. Examples include SEv (Security Event) and QSEv (Qualified Security Event) generated by a security sensor installed in the individual ECU 20e, driving logs, and the like. Further, the log generation unit 103 may generate a log periodically or when some triggers occur. Hereinafter, the log generated by the log generation unit 103 will be referred to as an own device generation log.

The log storage 104 stores the own device generation log generated by the log generation unit 103. Similarly to the date and time information storage 102, the log storage 104 can also use a nonvolatile or volatile recording medium. The own generation log stored in the log storage 104 is associated with second date and time information indicating the date and time when the log was generated. For example, when the log generation unit 103 generates the own device generation log, the log generation unit 103 reads the first date and time information stored in the date and time information storage 102, and adds it to the own device generation log as the second date and time information. Alternatively, when the log generation unit 103 generates the own generation log, it may request the date and time distribution device to distribute the first date and time information, and add the first date and time information received by the receiver 101 to the own device generation log as the second date and time information. In these cases, the second date and time information indicates the date and time when the own device generation log was generated. Note that the second date and time information only needs to be linked to the own device generation log, and the second date and time information does not necessarily have to be the content of the own device generation log.

The log storage 104 may store logs generated by other devices in addition to the own device generation log. That is, in this embodiment, the receiver 101 receives the log generated by the ECU 20 different from the individual ECU 20e, and stores it in the log storage 104. Hereinafter, a log generated by a different device will be referred to as a different device generation log. The example of the different device generation log is also the same as the example of the own device generation log. The different device generation log stored in the log storage 104 is transmitted from, for example, the different device in association with the second date and time information. The method of association of the different device generation log with the second date and time information by the different device is same as the example described for the own device generation log. However, when receiving the different device generation log, the first date and time information stored in the date and time information storage 102 may be associated with the different device generation log as second date and time information. Alternatively, the first date and time information received as a result of requesting distribution from the date and time distribution device may be associated as the second date and time information. In this case, the second date and time information indicates the date and time when the different device generation log was received.

The certification verification unit 105 verifies the integrity of the certification, whether the certification has been revoked, and whether the certification has expired. For verifying the integrity of the certification, the public key of certification authority stored in a key management unit (not shown) is used to verify whether the information included in the certification, such as the public key and validity period, has been tampered. For verifying whether the certification revocation is present, it is verified whether the certification has been revoked by comparing the certification with a certificate revocation list (CRL) stored in the key management unit (not shown). Verification of whether the certification has expired is verification of whether the certification has expired at the current date and time.

In this embodiment, the first date and time information is used to verify whether the certification has expired. For example, in a part (a) of FIG. 4, in a case where the validity period of the certification is from T1 to T2, when the current date and time, that is, the first date and time information is Tp1, the Tp1 is not included in the period from T1 to T2 (in other words, is outside the validity period). Therefore, it is determined that the expiration date of the certification has passed (in other words, the certification has expired). On the other hand, in a case where the first date and time information is Tp2, the Tp2 is included in the period from T1 to T2 (in other words, within the validity period). Therefore, it is determined that the certification has not expired (in other words, the Tp2 is before the validity period). Hereinafter, this verification will be referred to as verification of whether the expiration date has passed.

On the other hand, when the receiver 101 "cannot receive" the first date and time information from the date and time distribution device, the current time is unknown in the certification verification device 11. Therefore, it is not possible to verify whether the certification has expired. Note that any method can be used to determine when the receiver 101 cannot receive the first date and time information from the date and time distribution device. For example, when the first date and time information is distributed periodically from the date and time distribution device at a certain cycle, this case corresponds to the case where the first date and time information cannot be received even after a period exceeds the certain cycle. Further, the case where the first date and time information is acquired by transmitting a request to the date and time distribution device, this corresponds to a case where the first date and time information cannot be received after a predetermined time from the transmission of the request. Here, "the case where the information cannot be received" means that the receiver of the certification verification device cannot receive the information, and the cause for the reception failure does not matter. For example, the case may include a case where the cause is in the receiver of the certification verification device, a case where the cause is in the date and time distribution device, a case where the cause is in the device that provides date and time information to the date and time distribution device, and a case where the cause is in the communication between these devices.

Therefore, in this embodiment, when the receiver 101 "cannot receive" the first date and time information from the date and time distribution device, the certification verification unit 105 uses the second date and time information associated with the log stored in the log storage 104 to verify whether the certification has expired. Specifically, the certification verification unit 105 reads the second date and time information indicating the latest time and date from among the logs that are stored in the log storage 104 and include the own device generation log and the different device generation log, and verifies whether the certification has expired. For example, in a part (b) of FIG. 4, in a case where the validity period of the certification is from T1 to T2, when the latest date and time of the log, that is, the second date and time information is Tr1, the Tr1 is not included in the period from T1 to T2 (in other words, is outside the validity period). Therefore, it is determined that the certification has expired. On the other hand, when the second date and time information is Tr2, the Tr2 is included in the period from T1 to T2, but it is not guaranteed that the Tr2 indicates the current date and time, so it is not possible to determine the certification has not expired. In other words, it is not possible to determine whether the certification validity period has expired. In this manner, in this embodiment, by using the second date and time information, it may be possible to determine that the certification has expired. Hereinafter, this verification will be referred to as expiration verification.

Note that it is desirable that the time of the different device be synchronized with the date and time distribution device. For example, the certification verification unit 105 selects the different device whose time is synchronized with the date and time distribution device. It is possible to confirm whether the time of the date and time distribution device is synchronized by using, IEEE802.1AS protocol, for example. Alternatively, it is possible to confirm whether the time of the different device is synchronized with the date and time distribution device with the ECU 20, which manages information on whether the time is synchronized with the date and time distribution device. According to this configuration, even when logs generated by different devices are used, it is guaranteed that all logs are time synchronized with the date and time distribution device, so the latest second date and time information can be extracted. The above also applies to time synchronization between the own device and the date and time distribution device.

Note that in this embodiment, all logs stored in the log storage 104 are targeted, and logs generated by the own device and logs generated by different devices are not distinguished. Only the second date and time information of the own device generation log may be used as a log used for the certification verification unit 105. According to this configuration, there is no need to confirm whether the time is synchronized between the different device and the date and time distribution device, and it is possible to more quickly verify whether the certification has expired.

(2) Operation of Certification Verification Device

The operation of the certification verification device 11 will be described with reference to FIGS. 5 and 6. Note that the operations shown in FIGS. 5 and 6 not only show the certification verification method executed by the certification verification device 11, but also show a processing procedure of the certification verification program that can be executed by the certification verification device 11. An order of the processes described above is not limited to that illustrated in FIGS. 5 and 6. That is, unless there is a restriction such as a relationship in which a step uses a result of the previous step, the order may be reversed. This also applies to FIGS. 8 and 10 described later.

Figure 5:
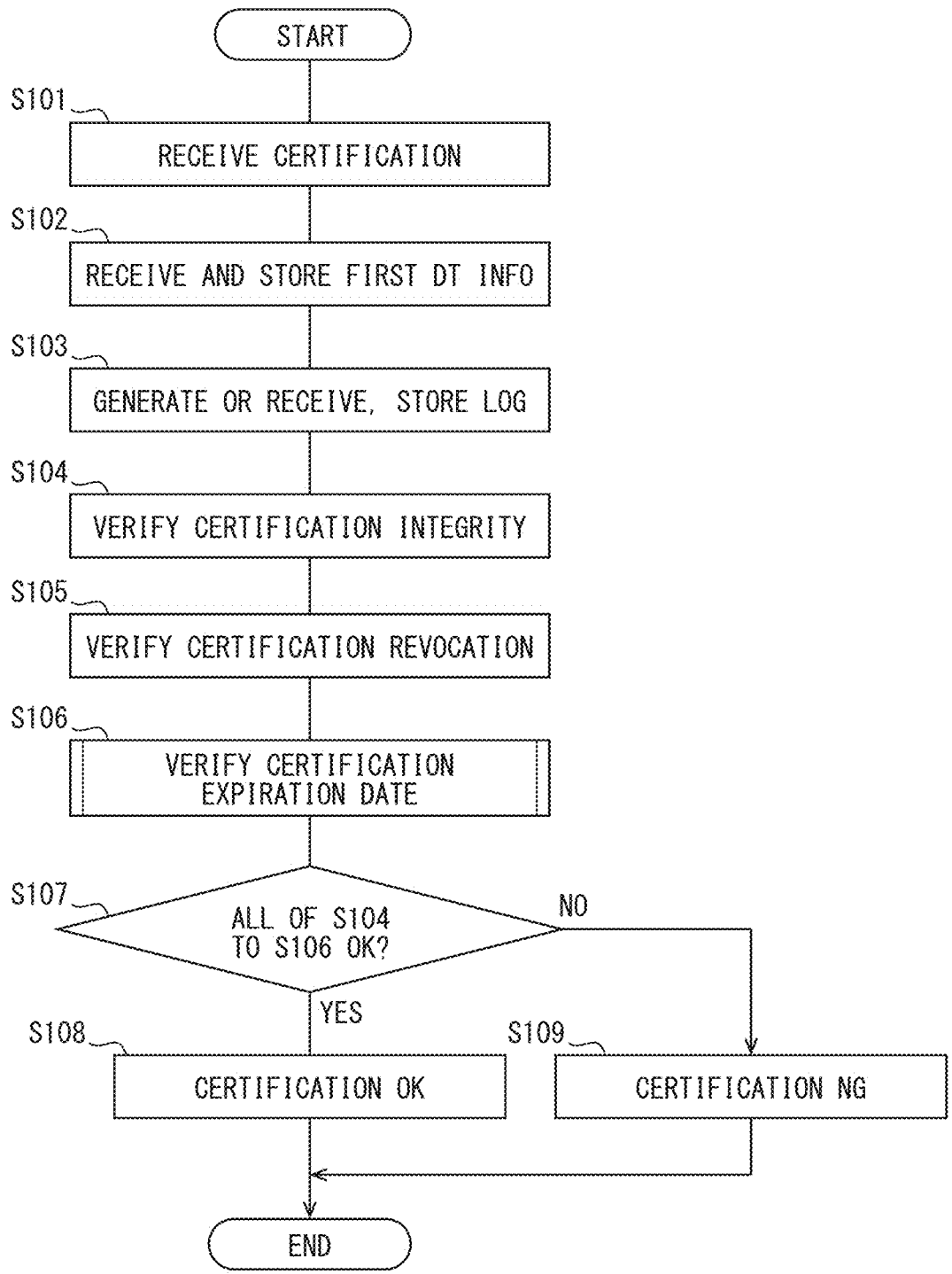
FIG. 5 is a flowchart illustrating an operation of the certification verification device according to the first embodiment.

FIG. 5 is a diagram illustrating the overall operation of the certification verification device 11. The receiver 101 of the certification verification device 11 receives a certification from the authentication request device (S101). The receiver 101 receives the first date and time information from the date and time distribution device, and stores it in the date and time information storage 102 (S102). The log generation unit 103 generates the own device generation log and stores it in the log storage 104 (S103). Further, the receiver 101 receives the different device generation log from the different device, and stores it in the log storage 104 (S103). The certification verification unit 105 verifies the integrity of the certification (S104) The certification verification unit 105 verifies whether the certification has been revoked (S105). The certification verification unit 105 verifies whether the certification has expired (S106). Details of S106 will be described with reference to FIG. 6. When all the verifications in S104 to S106 are successful (S107: Yes), the certification verification unit 105 outputs information indicating that the verification was successful (for example, indicating that the certification is valid) (S108). On the other hand, when all the verifications in S104 to S106 are not successful (S107: No), that is, when at least one of the verifications in S104 to S106 is not successful, the certification verification unit 105 outputs, as the verification result of the certification, information indicating that the verification has failed (for example, information indicating that the certification is not valid) (S109).

Figure 6:
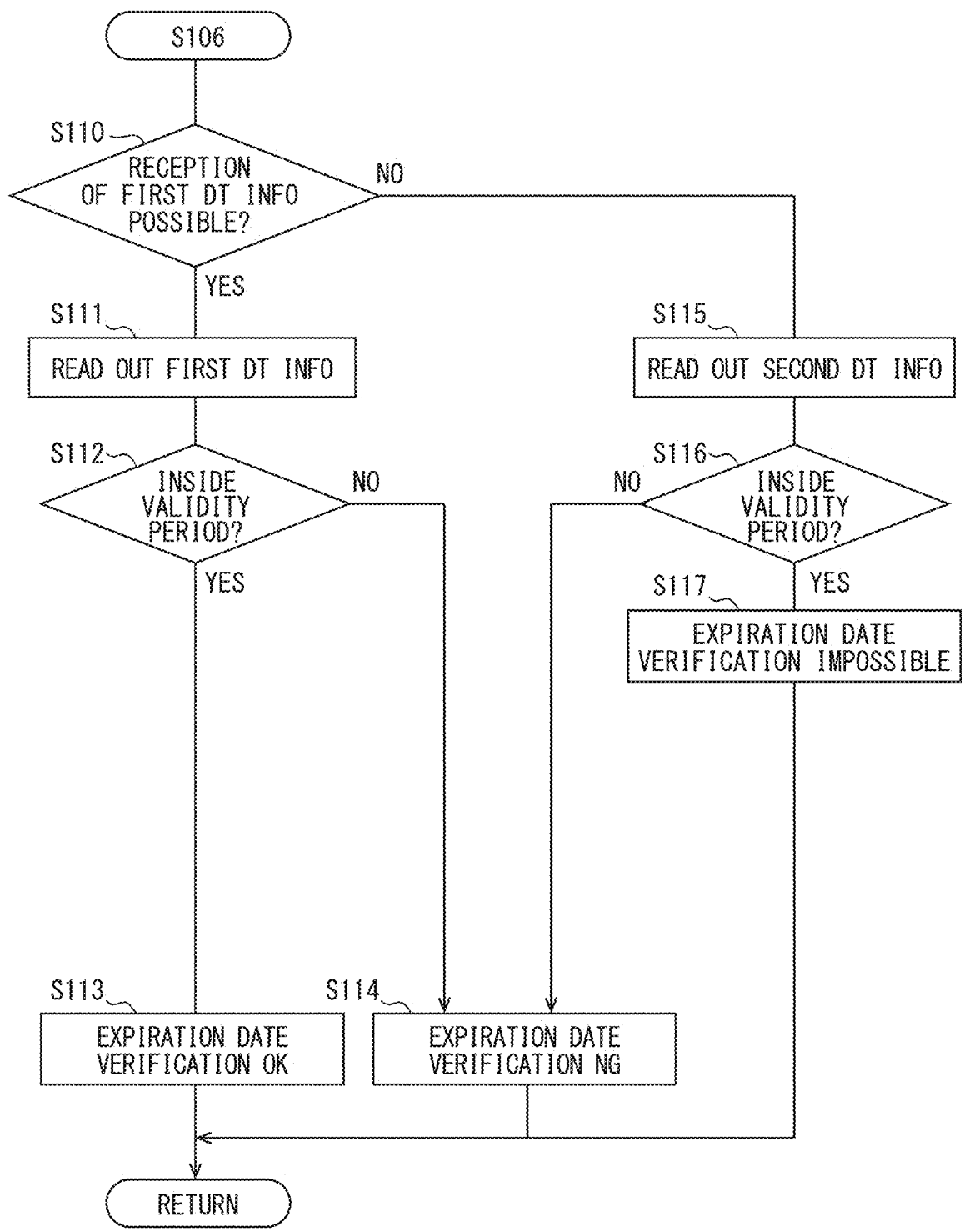
FIG. 6 is a diagram illustrating an operation of the certification verification unit of the certification verification device according to the first embodiment.

FIG. 6 is a diagram illustrating details of the verification operation (S106) of the certification verification unit 105 of the certification verification device 11 to determine whether the validity period has expired. The certification verification unit 105 verifies whether the first date and time information is receivable (S110). When the reception of the first date and time information is possible (S110: Yes), the certification verification unit 105 reads the first date and time information from the date and time information storage 102 (S111). When the first date and time information is within the validity period of the certification (S112: Yes), the certification verification unit 105 determines that the validity period verification has been successful (S113). When the first date and time information is not within the validity period of the certification (S112: No), the certification verification unit 105 determines that the validity period verification has been failed (S114). On the other hand, when the reception of the first date and time information is not possible (S110: No), the certification verification unit 105 reads the latest second date and time information from the log storage 104 (S115). When the second date and time information is within the validity period of the certification (S116: Yes), the certification verification unit 105 determines that the expiration date verification is not possible (S117). When the second date and time information is not within the validity period of the certification (S116: No), the certification verification unit 105 determines that the expiration date verification has failed (S114).

(3) Short Overview

As described above, according to the present embodiment, even when the receiver 101 cannot receive the first date and time information, it is possible to verify whether the certification expiration date has passed using the second date and time information associated with the own device generation log and the different device generation log. In particular, when it can be determined that the expiration date has passed, it is possible to quickly execute processes required in the case of expiration. In addition, by using not only the own device generation log but also the different device generation log, even when there is the failure in acquisition of the second date and time information by the own device or there is the failure in the addition of the second date and time information to the own device generation log, it is possible to reflect the latest second time and date information. Then, the certification verification device 11 verifies the expiration of the certification based on the log already stored in the log storage 104. Therefore, there is no need to inquire about date and time information from other devices, and it is possible to prevent an increase in traffic on the in-vehicle network.

3. Second Embodiment (1) Configuration of Certification Verification Device

In the first embodiment, when the receiver 101 cannot receive the first date and time information, it is verified whether the expiration date has passed using the second date and time information associated with the log. In this embodiment, in addition to the second date and time information associated with the log, the first date and time information stored in the date and time information storage 102 is also used to verify expiration.

Figure 7:
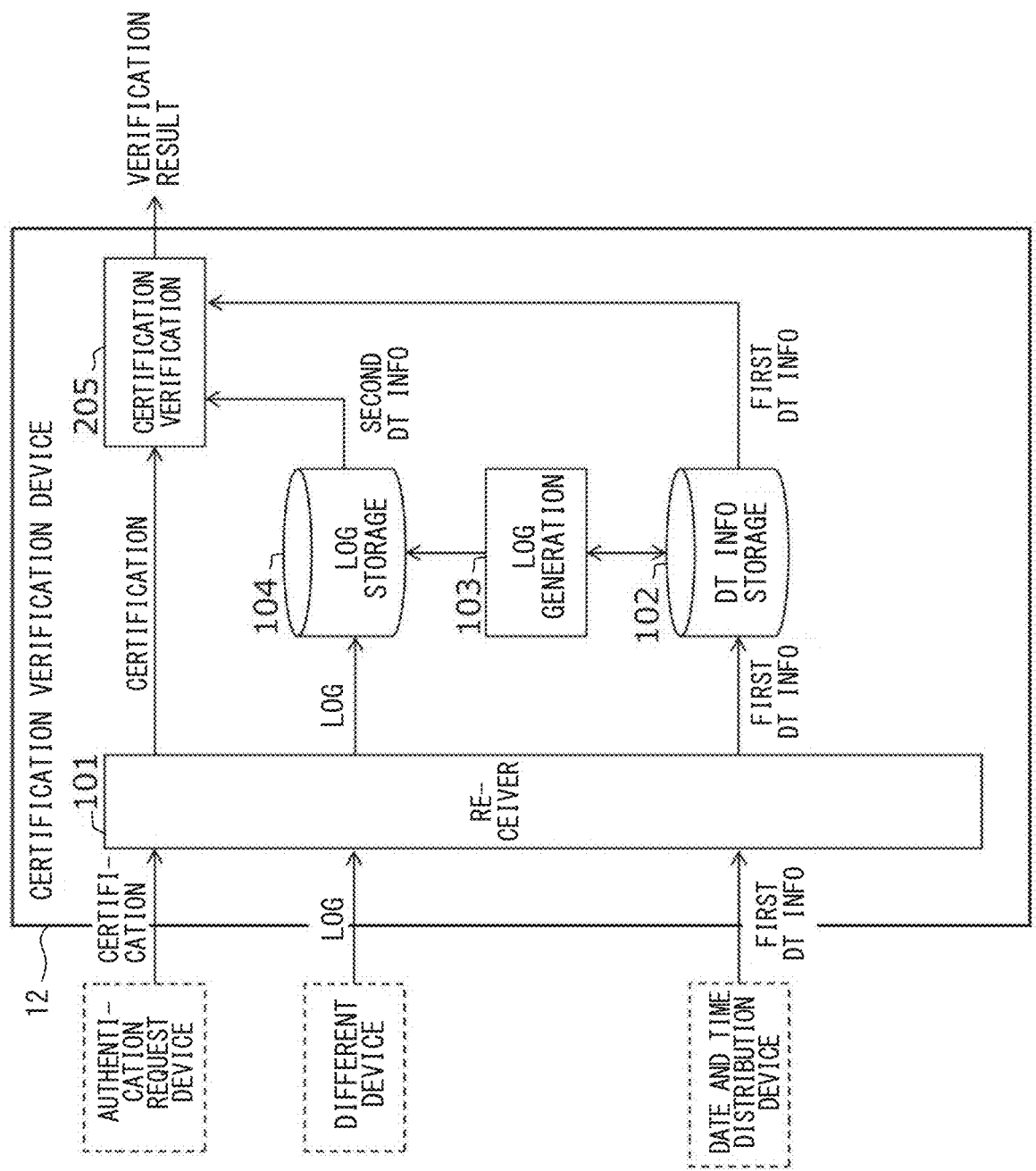
FIG. 7 is a block diagram illustrating a configuration of the certification verification device according to a second embodiment.

A configuration example of the certification verification device 12 according to the present embodiment will be described with reference to FIG. 7. The configuration of the certification verification device 12 of this embodiment is the same as the configuration of the certification verification device 11 of the first embodiment shown in FIG. 3, except for part of the operation of the certification verification unit 205. The same components as in FIG. 3 are given the same numbers as in FIG. 3, and the description of the first embodiment is cited. Hereinafter, only portions different from those according to the first embodiment will be described.

When the receiver 101 "cannot receive" the first date and time information from the date and time distribution device, the certification verification unit 205 uses the latest date and time information among the past received first date and time information stored in the date and time information storage 102 and the second date and time information associated with the log stored in the log storage 104 to verify whether the certification has expired. In other words, even when the first date and time information cannot be received, the first date and time information received in the past is stored in the date and time information storage 102. Thereby, the expiration of the certification is verified using the latest date and time information of the first date and time information and the second date and time information.

Also in the case of the second embodiment, the description regarding the time synchronization between the different device generation log and the date and time distribution device in the first embodiment and description regarding the own device generation log and the different device generation log also apply. Therefore, these descriptions are also cited in this embodiment.

(2) Operation of Certification Verification Device

Figure 8:
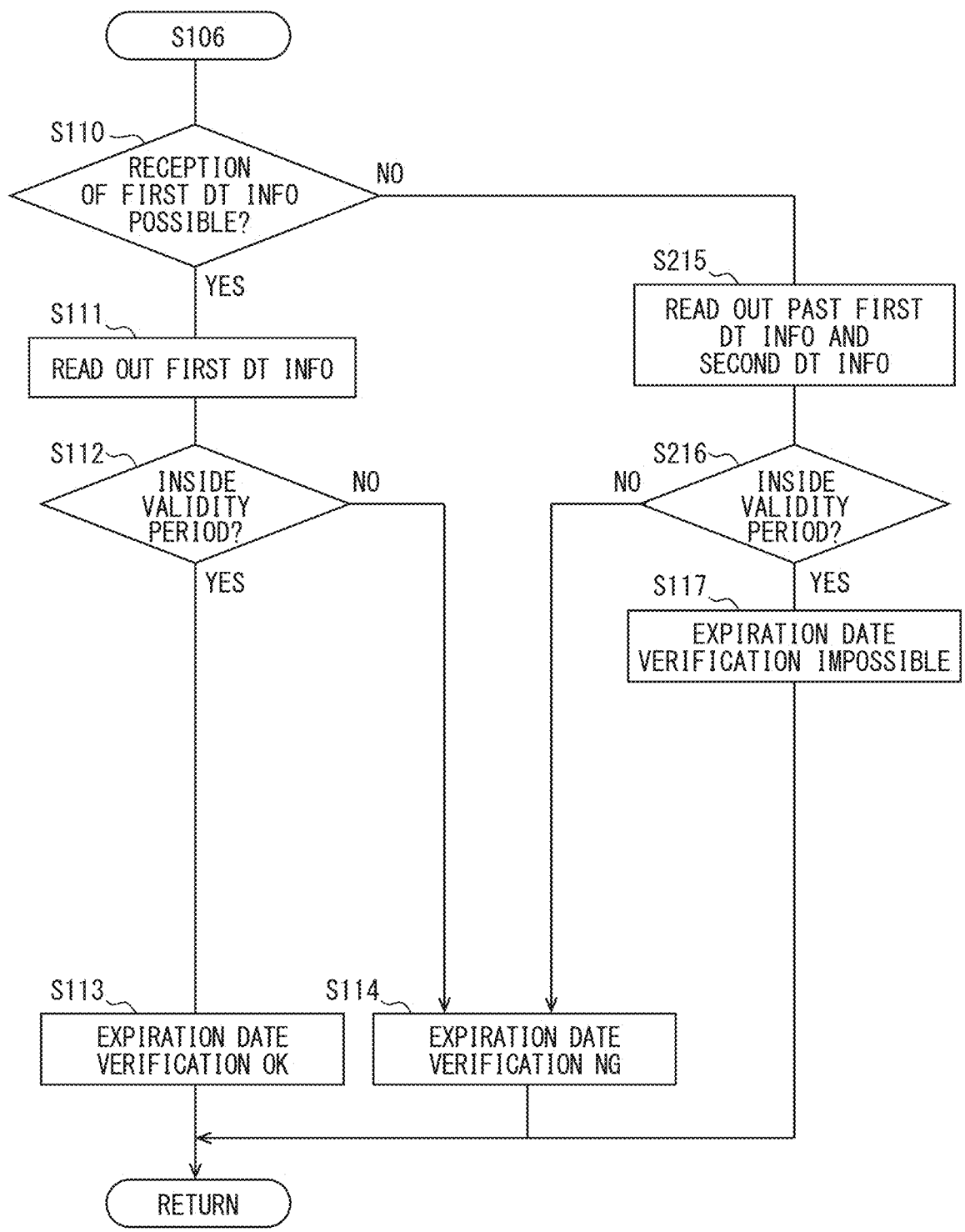
FIG. 8 is a diagram illustrating an operation of the certification verification unit of the certification verification device according to the second embodiment.

The operation of the certification verification device 12 will be described with reference to FIGS. 5 and 8. Since the operation shown in FIG. 5 is common to that of the certification verification device 12 of this embodiment, the description of FIG. 5 and FIG. 5 will be referred to in this embodiment. Further, in FIG. 8, parts common to those in FIG. 6 are given the same process numbers, and the description of FIG. 6 is referred to in this embodiment. Hereinafter, parts different from those in FIG. 6 will be described.

When the reception of the first date and time information is not possible (S110: No), the certification verification unit 205 reads the latest first date and time received in the past stored in the date and time information storage 102 and the latest second date and time information stored in the log storage 104 (S215). The certification verification unit 205 verifies the expiration of the certification using the latest date and time information among the first date and time information and the second date and time information read in S215 (S216). That is, when the latest date and time information is within the validity period of the certification (S216: Yes), the certification verification unit 205 determines that the validity period verification is not possible (S117). When the second date and time information is not within the validity period of the certification (S216: No), the certification verification unit 205 determines that the validity period verification has failed (S114).

(3) Short Overview

As described above, according to the present embodiment, even when the receiver 101 cannot receive the first date and time information, the latest date and time information is used for expiration date verification among the first date and time information and the second date and time information received in the past. Therefore, it is possible to perform verification using date and time information that is closer to the current time, and improve the accuracy of verification of certification expiration. Then, the expiration of the certification is verified based on the date and time information already held by the certification verification device 11. Therefore, there is no need to inquire about date and time information from other devices, and it is possible to prevent an increase in traffic on the in-vehicle network.

4. Third Embodiment (1) Configuration of Certification Verification Device

In this embodiment, third date and time information is received from a date and time distribution alternative device, and is used to verify whether the expiration date has passed.

Figure 9:
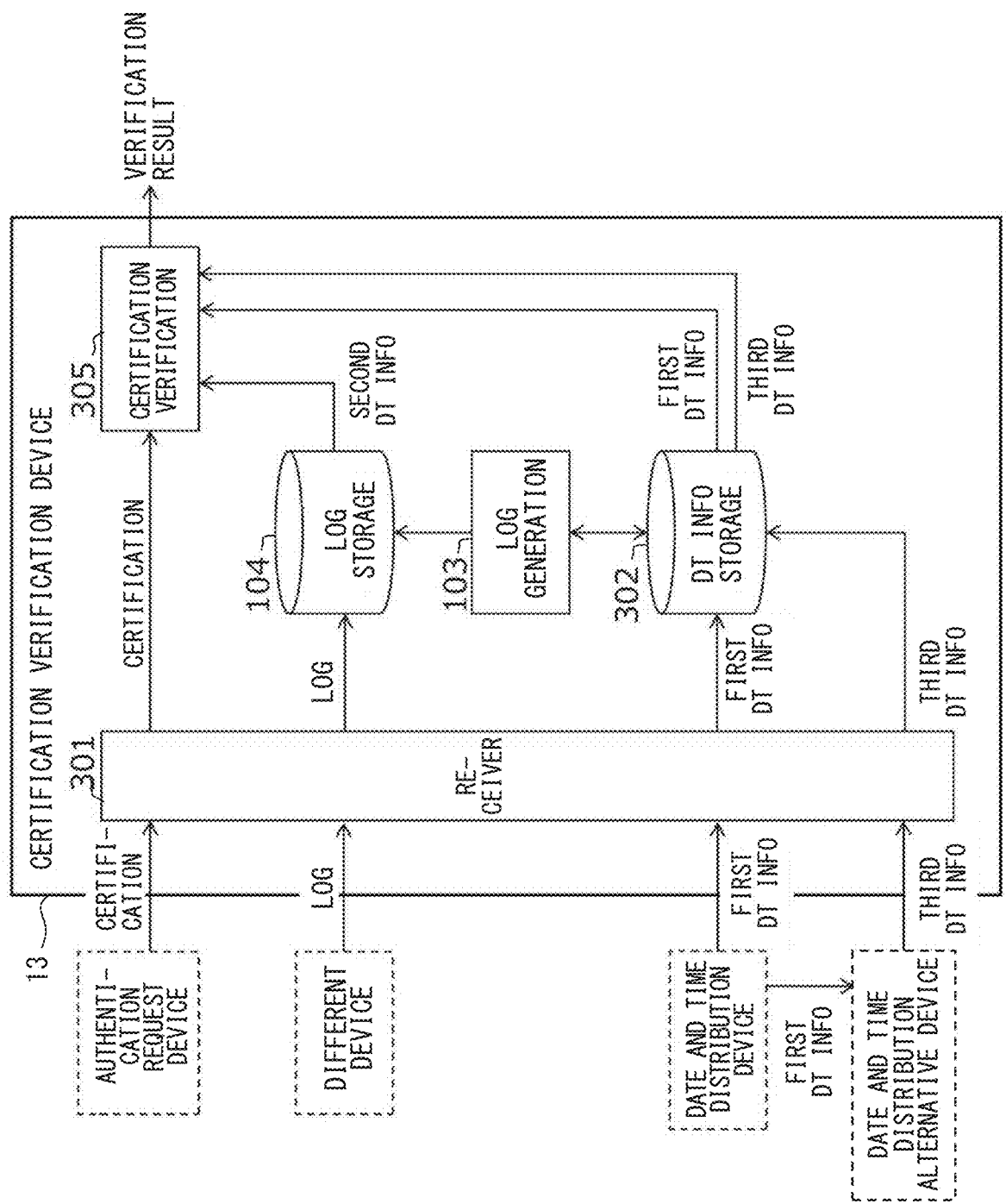
FIG. 9 is a block diagram illustrating a configuration of the certification verification device according to a third embodiment.

A configuration example of the certification verification device 13 according to the present embodiment will be described with reference to FIG. 9. The configuration of the certification verification device 13 of this embodiment includes a configuration related to the time and date distribution alternative device in addition to the configuration of the certification verification device 11 of the first embodiment shown in FIG. 3 and the configuration of the certification verification device 12 of the second embodiment shown in FIG. 7. The same components as in FIG. 3 are given the same numbers as in FIG. 3, and the description of the first embodiment is cited. Hereinafter, only portions different from those according to the first embodiment will be described.

In addition to receiving the certification from the authentication request device and the first date and time information from the date and time distribution device, a receiver 301 receives third date and time information from the date and time distribution alternative device. The date and time distribution alternative device is connected to the date and time distribution device, and receives the first date and time information from the date and time distribution device. Then, the date and time distribution alternative device transmits the stored first date and time information to the certification verification device 13 as the third date and time information, for example, in response to a request from the certification verification device 13. The date and time distribution alternative device may be any device that receives and stores the first date and time information from the date and time distribution device. For example, in FIG. 2, the integrated ECU 20a corresponds to the date and time distribution alternative device. In addition, the zone ECU 20c or the zone ECU 20d may correspond to it.

Note that it is desirable that the date and time distribution alternative device is a device that is time synchronized with the date and time distribution device. For example, a certification verification unit 305 selects the date and time distribution alternative device whose time has been synchronized with the date and time distribution device. To confirm whether the time is synchronized with the date and time distribution device, for example, the certification verification device 13 may send an inquiry as to whether the time has been synchronized, and receive, from the date and time distribution alternative device, answers of whether the time has been synchronized. Alternatively, the inquiry may be sent to the ECU 20 that manages information on whether time synchronization is achieved with the date and time distribution device, and the answer may be received from the ECU 20.

The date and time information storage 302 stores the third date and time information received by the receiver 301 in addition to the first date and time information.

When the certification verification unit 305 cannot determine whether the validity period of the certification has expired, it reads the third date and time information from the date and time information storage 302 and uses the third date and time information to verify whether the certification has expired. That is, in the first and second embodiments, when it is impossible to verify whether the certification has expired, the certification verification unit 305 uses the third date and time information to verify whether the certification has expired.

(2) Operation of Certification Verification Device

Figure 10:
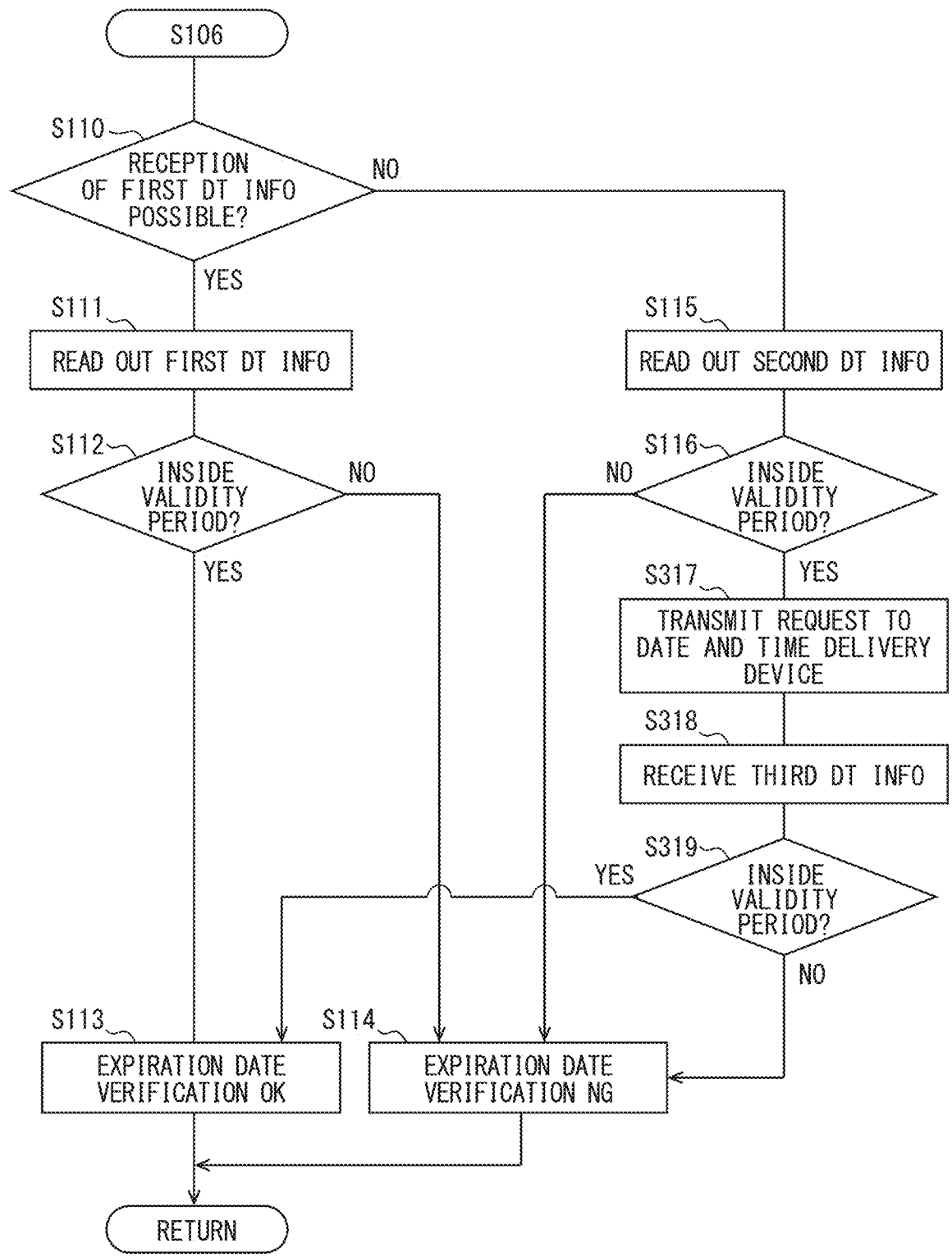
FIG. 10 is a diagram illustrating an operation of the certification verification unit of the certification verification device according to the third embodiment.

The operation of the certification verification device 13 will be described with reference to FIGS. 5 and 10. Since the operation shown in FIG. 5 is common to that of the certification verification device 13 of this embodiment, the description of FIG. 5 and FIG. 5 will be referred to in this embodiment. Further, in FIG. 10, parts common to those in FIG. 6 are given the same process numbers, and the description of FIG. 6 is referred to in this embodiment. Hereinafter, parts different from those in FIG. 6 will be described.

When the second date and time information is within the validity period of the certification (S116: Yes), the certification verification unit 305 transmits a request for date and time information to the date and time distribution alternative device (S317). The receiver 301 receives the third date and time information from the date and time distribution alternative device (S318). Then, when the third date and time information is within the validity period of the certification (S319: Yes), the certification verification unit 305 determines that the validity period verification has been successful (S113). When the third date and time information is not within the validity period of the certification (S319: No), the certification verification unit 305 determines that the validity period verification has failed (S114). Note that when the third date and time information cannot be received in S318, the expiration date verification may be disabled.

(3) Short Overview

As described above, according to the present embodiment, even when it is impossible to verify the expiration date of the certification using the first date and time information and the second date and time information received in the past, the third date and time information is used to verify whether the certification has expired. In addition, the date and time information of the different device called the date and time information distribution alternative device is used. Therefore, even when there is the failure in acquiring the first date and time information on the own device, it is possible to use the third date and time information, which is accurate date and time information received from the normally operating date and time information distribution device, for verifying whether the validity period has expired.

5. Other Devices

In the third embodiment, when it is impossible to verify the expiration of the certificate using the first date and time information and the second date and time information, the third date and time information is used to verify whether the certification has expired. However, when the receiver 301 cannot receive the first date and time information, the certification verification unit 305 may use the third date and time information to verify whether the certification has expired.

6. Overview

The features of the certification verification device or the like according to each embodiment of the present disclosure have been described above.

Since terms used in the embodiments are examples, the terms may be replaced with synonymous terms or terms including synonymous functions.

The block diagrams used for the description of the embodiments are obtained by classifying and organizing the configurations of the devices for each function. The blocks representing the respective functions may be implemented by any combination of hardware or software. Since the blocks represent the functions, such a block diagram may also be understood as disclosures of a method and a program for implementing the method.

An order of functional blocks that can be understood as processes, flows, and methods described in the embodiments may be changed as long as there are no restrictions such as a relation in which results of preceding processes are used in one other process.

Further, examples of the device described in the present disclosure include the following. Examples of a form of a component include a semiconductor element, an electronic circuit, a module, and a microcomputer. Examples of a form of a semi-finished product include an electric control unit (ECU) and a system board. Examples of a form of a finished product include a cellular phone, a smartphone, a tablet computer, a personal computer (PC), a workstation, and a server. In addition, the devices may include a device having a communication function or the like, and examples thereof include a video camera, a still camera, and a car navigation system.

Necessary functions such as an antenna or a communication interface may be added to the device.

The device can be implemented not only by dedicated hardware having the configurations and functions described in the embodiments, but also by a combination of a program, which is recorded on a recording medium such as a memory or a hard disk and is used for implementing the invention, and general-purpose hardware that has a dedicated or general-purpose CPU that can execute the program, a memory, and the like.

A program stored in a non-transitory tangible storage medium (for example, an external storage device (a hard disk, a USB memory, and a CD/BD) of dedicated or general-purpose hardware, or an internal storage device (a RAM, a ROM, and the like)) may also be provided to dedicated or general-purpose hardware via the recording medium or from a server via a communication line without using the recording medium. Thereby, the latest functions can be provided at all times through program upgrade.

INDUSTRIAL APPLICABILITY

The certification verification device according to the present disclosure has been described mainly to use for an in-vehicle electronic control unit mounted on a vehicle, alternatively, the update control device may be applied to general mobile bodies such as a motorcycle, a ship, a train, and an aircraft. Further, the present disclosure is applicable not only to mobile objects but also to general products including microcomputers.

Here, the process of the flowchart or the flowchart described in this application includes a plurality of sections (or steps), and each section is expressed as, for example, S101. Further, each section may be divided into several subsections, while several sections may be combined into one section. Furthermore, each section thus configured may be referred to as a device, module, or means.

The control unit and method described in the present disclosure may be implemented by a special purpose computer created by configuring a memory and a processor programmed to execute one or more particular functions embodied in computer programs. Alternatively, the control unit and method described in the present disclosure may be implemented by a special purpose computer created by configuring a processor provided by one or more special purpose hardware logic circuits. Alternatively, the control unit and method described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

Further, according to another example of the above embodiments, a situation is assumed in which a process in response to a request from a communication partner is not executed. For example, it is assumed that, when an ECU receives a reprograming request (for example, software update request), the ECU determines whether the communication partner (for example, a center, or a reprograming tool, or a different ECU), which has transmitted the request, is reliable by performing verification using the certification. In this case, when the verification result is negative, the ECU determines that the communication partner is not reliable, and disconnects the communication and does not execute the process (for example, reprogramming process).

The invention claimed is:

1. A certification verification device for verifying an expiration date of a certification, the device comprising:
   a receiver configured to receive the certification from an authentication request device, and first date and time information that is time and date information from a date and time distribution device;
   a date and time information storage configured to store the first date and time information;
   a log storage configured to store a log generated or received by the certification verification device; and
   a certification verification unit configured to verify whether the certification has expired using the first date and time information,
   wherein reception of the first date and time information by the receiver is not possible, the certification verification unit uses second date and time information associated with the log stored in the log storage to verify whether the certification has expired; and
   the certification verification unit is configured to select the different device whose time has been synchronized with the date and time distribution device, and use latest date and time information in the second date and time information associated with the own device generation log and the different device generation log.

2. The certification verification device according to claim 1, wherein
   the certification verification unit is configured to use latest date and time information in the second date and time information associated with each of an own device generation log generated by the certification verification device and a different device generation log generated by a different device that is a device different from the certification verification device.

3. The certification verification device according to claim 1, wherein
   the certification verification unit is configured to use the second date and time information associated with an own device generation log generated by the certification verification device.

4. The certification verification device according to claim 1, wherein
   when the reception of the first date and time information by the receiver is not possible, the certification verification unit verifies whether the certification has expired using latest date and time information in the first date and time information and the second date and time information that are stored in the date and time information storage and received in past.

5. The certification verification device according to claim 1, wherein
   the receiver is configured to receive third date and time information from a date and time distribution alternative device connected to the date and time distribution device, and
   the certification verification unit verifies whether the certification has expired using the third date and time information when determination, by the certification verification unit, of whether the certification has expired is not possible.

6. The certification verification device according to claim 5, wherein
   the certification verification unit is configured to select the date and time distribution alternative device whose time has been synchronized with the date and time distribution device, and verify whether the certification has expired using the third date and time information received from the date and time distribution device whose time has been synchronized with the date and time distribution device.

7. The certification verification device according to claim 1, wherein the certification verification device is mounted on a mobile object.

8. A certification verification method executed by a certification verification device that verifies an expiration date of a certification, the method comprising:

receiving the certification from an authentication request device and first date and time information that is time and date information from a date and time distribution device;

storing the first date and time information;

storing a log generated or received by the certification verification device;

verifying whether the certification has expired using the first date and time information;

when reception of the first date and time information is not possible, using second date and time information associated with the stored log to verify whether the certification has expired;

selecting the different device whose time has been synchronized with the date and time distribution device, and using latest date and time information in the second date and time information associated with the own device generation log and the different device generation log.

9. A non-transitory computer-readable storage medium storing a certification verification program that is executable by a certification verification device that verifies an expiration date of a certification, the program being configured to:

receive the certification from an authentication request device and first date and time information that is time and date information from a date and time distribution device;

store the first date and time information;

store a log generated or received by the certification verification device;

verify whether the certification has expired using the first date and time information;

when reception of the first date and time information is not possible, use second date and time information associated with the stored log to verify whether the certification has expired;

select the different device whose time has been synchronized with the date and time distribution device, and use latest date and time information in the second date and time information associated with the own device generation log and the different device generation log.

10. The certification verification device according to claim 1, further comprising:

a processor; and a memory coupled to the processor and storing program instructions that when executed by the processor cause the processor to at least serve as: the receiver; the date and time information storage; the log storage; and the certification verification unit.

* * * * *